US009448578B1

(12) United States Patent
Deng et al.

(10) Patent No.: US 9,448,578 B1
(45) Date of Patent: Sep. 20, 2016

(54) INTERFACE SUPPLY CIRCUIT

(71) Applicants: HONG FU JIN PRECISION INDUSTRY (WuHan) Co., LTD., Wuhan (CN); HON HAI PRECISION INDUSTRY CO., LTD., New Taipei (TW)

(72) Inventors: Jun-Yi Deng, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/682,685

(22) Filed: Apr. 9, 2015

(30) Foreign Application Priority Data

Mar. 18, 2015 (CN) .......................... 2015 1 0120129

(51) Int. Cl.
*G05F 3/02* (2006.01)
*G06F 1/32* (2006.01)

(52) U.S. Cl.
CPC ....................................... *G05F 3/02* (2013.01)

(58) Field of Classification Search
CPC .......... G05F 3/02; G06F 1/32; G06F 1/3287; G06F 11/3051
See application file for complete search history.

(56) References Cited

U.S. PATENT DOCUMENTS 7,624,303 B2 * 11/2009 Burkland .................. G06F 1/30 324/500
2014/0095916 A1 * 4/2014 Chen ..................... G06F 1/3253 713/324

* cited by examiner

*Primary Examiner* — Jeffrey Zweizig
(74) *Attorney, Agent, or Firm* — Zhigang Ma

(57) ABSTRACT

An interface supply circuit includes a power supply unit, a first and a second control circuit, and a detection unit coupled to an interface. The detection unit is configured to output a first control signal upon detecting a corresponding device is inserted into the interface and output a second control signal upon detecting no device is inserted into the interface. The first control circuit is configured to switch off in event receiving the first control signal and switch on in event receiving the second control signal. The second control circuit is configured to switch on in event the first control circuit is switched off and switch off in event the first control circuit is switched on. The power supply unit is configured to supply power to the interface after the second control circuit is switched on and be disconnected from the interface after the second control circuit is switched off.

20 Claims, 2 Drawing Sheets

INTERFACE SUPPLY CIRCUIT

FIELD

The subject matter herein generally relates to power supply circuits.

BACKGROUND

A plurality of interfaces are mounted in a motherboard. A power supply unit supplies power to the interfaces even when no devices are attached.

BRIEF DESCRIPTION OF THE DRAWINGS

Implementations of the present technology will now be described, by way of example only, with reference to the attached figures.

DETAILED DESCRIPTION

Figure 1:
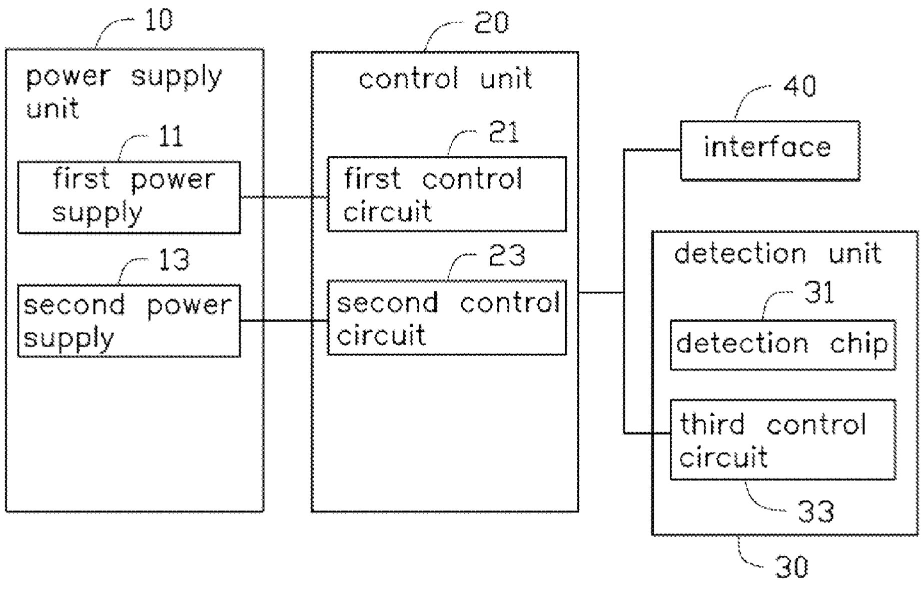
FIG. 1 is a block diagram of one embodiment of an interface supply circuit and an interface.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The present disclosure is described in relation to a power supply circuit used to supply power to an interface.

FIG. 1 illustrates an embodiment of an interface supply circuit. The interface supply circuit comprises a power supply unit 10, a control unit 20, and a detection unit 30. The control unit 20 and the detection unit 30 are configured to couple to an interface 40. The interface 40 is configured to receive a device (not shown). The power supply unit 10 is configured to supply power to the interface 40 via the control unit 20 upon the interface 40 receiving the device.

The power supply unit 10 comprises a first power supply 11 and a second power supply 13. The control unit 20 comprises a first control circuit 21 coupled to the detection unit 30 and a second control circuit 23 coupled to the first control circuit 21. The first control circuit 21 is coupled to the first power supply 11. The second control circuit 23 is coupled to the second power supply 13.

In one embodiment, the first power supply 11 is configured to provide a 5V first voltage and the second power supply 13 is configured to provide a 3V second voltage.

The detection unit 30 comprises a detection chip 31 and a third control circuit 33. In one embodiment, the detection chip 31 is a platform controller hub (PCH) chip and is configured to detect whether the interface 40 receives the device.

The detection chip 31 is configured to output a first control signal after detecting a corresponding device inserted into the interface 40. The second power supply 13 is configured to be connected to the interface 40 after the control unit 20 receives the first control signal, thus supplying power to the interface 40. The detection chip 31 is further configured to output a second control signal after detecting no device inserted into the interface 40. The second power supply 13 is configured to be disconnected from the interface 40 after the control unit 20 receives the second control signal, thus the second power supply 13 does not supply power to the interface 40.

Figure 2:
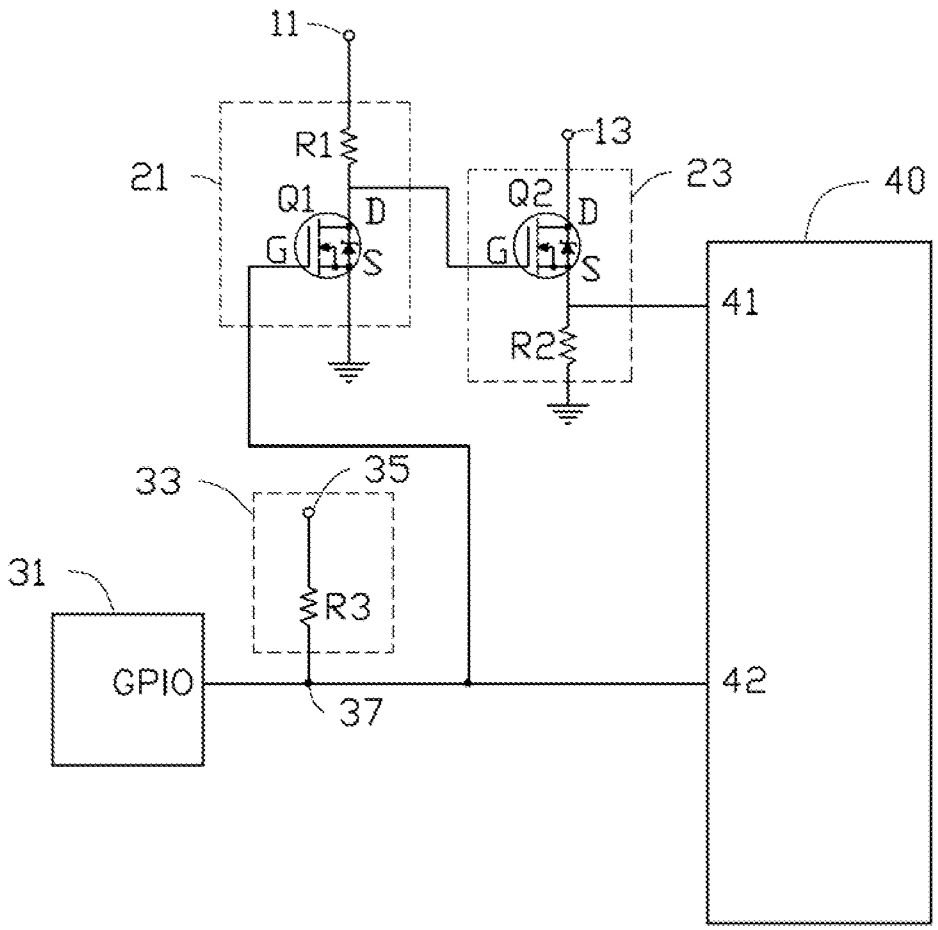
FIG. 2 is a circuit diagram of the interface supply circuit and the interface of FIG. 1.

FIG. 2 illustrates that the first control circuit 21 comprises a first field effect transistor (FET) Q1 and a first resistor R1. The second control circuit 23 comprises a second FET Q2 and a second resistor R2. Each of the first FET Q1 and the second FET Q2 comprises a control terminal G, a first connecting terminal S, and a second connecting terminal D.

The detection chip 31 comprises an input/output pin GPIO. The third control circuit 33 comprises a third resistor R3 and a third power supply 35.

The interface 40 comprises a power supply terminal 41 and a detection terminal 42.

The input/output pin GPIO of the detection chip 31 is coupled to a node 37. The node 37 is coupled to one end of the third resistor R3. The other end of the third resistor R3 is coupled to the third power supply 35. The node 37 is coupled to the detection terminal 42 of the interface 40. The node 37 is coupled to the control terminal G of the first FET Q1. The first connecting terminal S of the first FET Q1 is grounded. The second connecting terminal D of the first FET Q1 is coupled to one end of the first resistor R1. The other end of the first resistor R1 is coupled to the first power supply 11. The second connecting terminal D of the first FET Q1 is coupled to the control terminal G of the second FET Q2. The second connecting terminal D of the second FET Q2 is coupled to the second power supply 13. The first connecting terminal S of the second FET Q2 is coupled to the power supply terminal 41 of the interface 40. The first connecting terminal S of the second FET Q2 is coupled to one end of the second resistor R2. The other end of the second resistor R2 is grounded.

In one embodiment, each of the first FET Q1 and the second FET Q2 is a p-channel FET, each control terminal G is a gate terminal, each first connecting terminal S is a source terminal, and each second connecting terminal D is a drain terminal.

A working principle of the interface supply circuit is as follows. When the detection chip 31 detects a corresponding device inserted into the interface 40, the detection unit 30 outputs a first control signal. The first FET Q1 is switched off. The second FET Q2 is switched on. The second power supply 13 supplies power to the interface 40. When the detection chip 31 detects no device inserted into the interface 40, the detection unit 30 outputs a second control signal. The first FET Q1 is switched on. The second FET Q2 is switched off. The interface 40 is disconnected from the second power supply 13. The second power supply 13 does not supply power to the interface 40, thereby decreasing power and avoiding short circuits when conductive materials drop into the interface 40. In one embodiment, the first control signal is a low level signal and the second control signal is a high level signal.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure to the full extent indicated by the broad general meaning of the terms in which the appended claims are expressed.

What is claimed is:

1. An interface supply circuit comprising:

a first control circuit;

a second control circuit coupled to the first control circuit;

a power supply unit coupled to the second control circuit; and a detection unit couplable to an interface;

wherein the detection unit is configured to output a first control signal upon detecting that a corresponding device is inserted into the interface and output a second control signal upon detecting that no device is inserted into the interface;

wherein the first control circuit is configured to switch off upon receiving the first control signal and switch on upon receiving the second control signal;

wherein the second control circuit is configured to switch on in event the first control circuit is switched off and switch off in event the first control circuit is switched on; and wherein the power supply unit is configured to supply power to the interface in event the second control circuit is switched on and be disconnected from the interface in event the second control circuit is switched off.

2. The interface supply circuit of claim 1, wherein the first control circuit comprises a first field effect transistor (FET), the first FET comprises a control terminal, a first connecting terminal, and a second connecting terminal, the control terminal of the first FET is coupled to the detection unit, the first connecting terminal of the first FET is grounded, and the second connecting terminal of the first FET is coupled to the second control circuit.

3. The interface supply circuit of claim 2, wherein the first control circuit further comprises a resistor, one end of the resistor is coupled to the power supply unit, and the other end of the resistor is coupled to the second connecting terminal of the first FET and the second control circuit.

4. The interface supply circuit of claim 2, wherein the second control circuit comprises a second FET, the second FET comprises a control terminal, a first connecting terminal, and a second connecting terminal, the control terminal of the second FET is coupled to the second connecting terminal of the first FET, the first connecting terminal of the second FET is coupled to the interface, and the second connecting terminal of the second FET is coupled to the power supply unit.

5. The interface supply circuit of claim 4, wherein the power supply unit comprises a first power supply coupled to the first FET and a second power supply coupled to the second FET, and the second power supply is configured to supply power to the interface upon the second FET is switched on.

6. The interface supply circuit of claim 4, wherein the second FET is a p-channel FET, the control terminal G of the second FET is a gate terminal, the first connecting terminal S of the second FET is a source terminal, and the second connecting terminal D of the second FET is a drain terminal.

7. The interface supply circuit of claim 2, wherein the detection unit comprises a detection chip configured to couple to the interface, the detection chip is configured to detect whether the device is inserted into the interface, and the detection chip is coupled to the control terminal of the first FET.

8. The interface supply circuit of claim 7, wherein the detection unit further comprises a resistor and a power supply, one end of the resistor is coupled to the power supply, and the other end of the resistor is coupled to the detection chip and is configured to couple to the interface.

9. The interface supply circuit of claim 7, wherein the detection chip is a platform controller hub (PCH) chip.

10. The interface supply circuit of claim 7, wherein the detection chip comprises an input/output pin, the interface comprises a detection terminal and a power supply terminal, the input/output pin of the detection chip is configured to couple to the detection terminal of the interface, and the second control circuit is configured to couple to the power supply terminal of the interface.

11. An interface supply circuit comprising:

a first control circuit having a first field effect transistor (FET);

a second control circuit coupled to the first control circuit;

a power supply unit coupled to the first FET and the second control circuit; and a detection unit coupled to the first control circuit and couplable to an interface;

wherein the detection unit is configured to output a first control signal upon detecting the interface receives that a corresponding device and output a second control signal upon detecting that the interface receives no device;

wherein the first FET is configured to switch off upon receiving the first control signal and switch on upon receiving the second control signal;

wherein the second control circuit is configured to switch on in event the first FET is switched off and switch off after the first FET is switched on; and wherein the power supply unit is configured to supply power to the interface in event the second control circuit is switched on and be disconnected from the interface in event the second control circuit is switched off.

12. The interface supply circuit of claim 11, wherein the first FET comprises a control terminal, a first connecting terminal, and a second connecting terminal, the control terminal of the first FET is coupled to the detection unit, the first connecting terminal of the first FET is grounded, and the second connecting terminal of the first FET is coupled to the second control circuit.

13. The interface supply circuit of claim 12, wherein the second control circuit comprises a second FET, the second FET comprises a control terminal, a first connecting terminal, and a second connecting terminal, the control terminal of the second FET is coupled to the second connecting terminal of the first FET, the first connecting terminal of the second FET is coupled to the interface, and the second connecting terminal of the second FET is coupled to the power supply unit.

14. The interface supply circuit of claim 13, wherein the power supply unit comprises a first power supply coupled to the first FET and a second power supply coupled to the second FET, and the second power supply is configured to supply power to the interface upon the second FET is switched on.

15. The interface supply circuit of claim 12, wherein the first FET is a p-channel FET, the control terminal G of the first FET is a gate terminal, the first connecting terminal S of the first FET is a source terminal, and the second connecting terminal D of the first FET is a drain terminal.

16. The interface supply circuit of claim 12, wherein the detection unit comprises a detection chip configured to couple to the interface, the detection chip is configured to detect whether the device is inserted into the interface, and the detection chip is coupled to the control terminal of the first FET.

17. The interface supply circuit of claim 16, wherein the detection unit further comprises a resistor and a power supply, one end of the resistor is coupled to the power supply, and the other end of the resistor is coupled to the detection chip and is configured to couple to the interface.

18. The interface supply circuit of claim 16, wherein the detection chip comprises an input/output pin, the interface comprises a detection terminal and a power supply terminal, the input/output pin of the detection chip is configured to couple to the detection terminal of the interface, and the second control circuit is configured to couple to the power supply terminal of the interface.

19. The interface supply circuit of claim 11, wherein the first control signal is a low level signal.

20. The interface supply circuit of claim 11, wherein the second control signal is a high level signal.

* * * * *